United States Patent [19]
McClelland

[11] Patent Number: 5,582,694
[45] Date of Patent: Dec. 10, 1996

[54] HYDRODISTILLATION PROCESS FOR ESSENTIAL MINT OILS

[75] Inventor: George D. McClelland, Fruitland, Id.

[73] Assignee: Idaho Mint Distiller, Inc., Fruitland, Id.

[21] Appl. No.: 310,150

[22] Filed: Sep. 21, 1994

[51] Int. Cl.⁶ ........................................ B01D 3/38
[52] U.S. Cl. ................ 203/96; 203/92; 159/16.3; 426/651
[58] Field of Search ............... 202/20.2; 159/16.3, 159/47.1; 426/489, 492, 651; 203/96, 92, 14, 100

[56] References Cited

U.S. PATENT DOCUMENTS

| | | | |
|---|---|---|---|
| 4,113,573 | 9/1978 | Gerow | 203/92 |
| 4,257,945 | 3/1981 | Martel | 202/169 |
| 4,319,963 | 3/1982 | Legast | 202/170 |
| 4,495,033 | 1/1985 | Rathbun et al. | 202/237 |
| 4,935,104 | 6/1990 | Coutiere | 203/95 |
| 5,024,820 | 6/1991 | Coutiere | 208/311 |
| 5,372,680 | 12/1994 | Bezdolny et al. | 203/92 |
| 5,425,962 | 6/1995 | Johnson et al. | 426/651 |

*Primary Examiner*—Virginia Manoharan
*Attorney, Agent, or Firm*—Margaret M. Dunbar

[57] ABSTRACT

A process for the hydrodistillation of mint oils from chopped mint plant. This process selectively collects mint oil condensates according to predetermined time, pressure and temperature parameters to better control the quality and quantity of mint oil distilled during the mint oil distillation process. This improved process provides improved yields and control over the hydrodistillation process of mint oil by manipulating time, temperature and pressure elements in the hydrodistillation process while requiring little or no equipment modification.

3 Claims, 1 Drawing Sheet

HYDRODISTILLATION PROCESS FOR ESSENTIAL MINT OILS

DESCRIPTION

BACKGROUND OF THE INVENTION

1. Technical Field

The present invention relates to the extraction of essential oils from plants. More particularly, the present invention relates to an improved process for the hydrodistillation of essential peppermint and spearmint oils from plant material.

2. Background

Oils harvested from plant sources are known as essential oils. Peppermint and spearmint are two such essential oils of significant commercial value. These oils are used in a wide variety of applications, from flavorings in food products to personal hygiene products, additives, and scent masking products. Worldwide demand for peppermint and spearmint oil products is increasing rapidly.

Peppermint and spearmint oils, generically referred to as mint oil, are comprised of a number of constituents. These components include, but are not limited to, pulegone, mentholfuran, limonene, menthone, menthofuran, menthol, menthyl acetate and a number of ester fractions.

TABLE 1

| Constituents of Peppermint Oil | Percentage |
| --- | --- |
| Menthol | 43.18% |
| Menthone | 20.48% |
| Menthol Acetate | 5.02% |
| 1,8 Cineole | 4.80% |
| Neomenthol | 3.34% |

*Balance made up of more than 20 other compounds.

TABLE II

| Major Components of Spearmint Oil | Percentage |
| --- | --- |
| 1-Carvone | 64.82% |
| Limonene | 17.94% |
| 3-Octanol | 1.78% |
| 1,8 Cineole | 1.45% |
| Menthone | 1.35% |

*Balance made up of more than 20 other compounds.

Each of these fractional components has a different commercial value and affects the color and taste of the oil. For example, pulegone is a known carcinogen that decreases the commercial value of the mint oil and is removed during reprocessing. Both fractional makeup and yield of mint oil vary significantly from location to location and batch to batch, depending on a number of factors, including weather, latitude, temperature conditions, soil conditions, sunlight, day length, leaf dimension, and other factors.

The batch process by which mint oil is commonly extracted from the plant is as follows: The mint plant is mowed and left to dry or cure in the field for a period of approximately two days. The mint hay is then mechanically chopped and blown into large distillation vats or tubs. Once the vats are full of chopped mint hay, they are ready for hydrodistillation.

Hydrodistillation is accomplished by introducing pressurized steam into the vat. The steam is directed through numerous small openings in the floor of the vat. From the openings, the steam passes through the chopped mint hay and is collected at the top of the vat. The steam is then routed through a return line to a condensation and separation apparatus. Steam and mint oil are condensed and collected from the condensing coil into a separation tank.

Within the separation tank the condensate separates into mint oil and water. Because of density differences, the mint oil rises to the top and the water sinks to the bottom of the separator. The mint oil is skimmed from the top of the separator and collected into storage containers, typically 55 gallon drums, for transportation and shipping. Water is drawn from the bottom of the separation tank and is further reprocessed by boiling in a reboiler. The vapor from the reboiler is then collected and condensed to collect additional mint oil.

The remaining water drawn from the bottom of the separation tank is reintroduced into the boiler to be processed into steam and fed back into the hydrodistillation loop. Each vat is typically processed by hydrodistillation for between 2 to 2½ hours.

The site and equipment required for hydrodistillation of mint oil represents a considerable capital investment. For this reason, it is common for one mint farmer to erect a hydrodistillation facility which is then cooperatively utilized by numerous farmers in the surrounding area. At harvest time, the mint growers will process on a cooperative basis.

Hydrodistillation is effective at extracting the majority of mint oil from chopped mint hay. Using the batch method as just described, all of the constituent components that make up the mint oil, desirable and undesirable, are collected. As bulk mint oil is collected in each batch process, it is combined in storage barrels for transportation. An undesirable result is unpredictable and non-uniform analysis results for each barrel of oil produced.

The essential mint oil produced by growers is purchased by mint oil brokers. The brokers reprocess the mint oil to selectively improve the quality and grade of mint oil for various intended uses. Reprocessing is expensive and reduces the original yields. Shrinkage losses in reprocessing range from 1% to 30%. Two important goals in reprocessing are to remove undesirable fractional components and to improve clarity.

The price and demand for bulk mint oil are regulated in the mint oil industry via cooperative efforts. Thus, the price growers receive for mint oil is primarily based on sample analyses from each barrel and current set price levels. Two important empirical qualities that impact price are quality and clarity.

What is needed is a process for harvesting mint oil that improves the quality and economic value of oil and is simple and economical to implement. Such an improved process would allow the producer to improve the quality and efficiency of the mint oil distillation process, thereby reducing the need for reprocessing and the associated shrinkage and economic loss.

It is an objective of the present invention to reduce or eliminate the need for reprocessing of mint oil by providing a higher quality raw product utilizing existing equipment.

It is another objective of the present invention to control the collection of the carcinogenic fractional components of spearmint and peppermint oils, thus further reducing the need for reprocessing and the associated shrinkage in yield.

It is a further objective of the present invention to provide a means for improving the control over the fractional composition of the mint oil and to improve product clarity.

It is an objective of the present invention to provide these quality and economic advantages, as well as other advantages utilizing existing equipment or requiring minimum retooling.

These and further objectives of the present invention will become readily apparent to one skilled in the art from the following detailed description and drawings.

DISCLOSURE OF INVENTION

The present invention is an improved process for the hydrodistillation of mint oils from chopped mint plant. This improved process selectively collects mint oil condensates according to predetermined time, pressure and temperature parameters to better control the quality and quantity of mint oil distilled during the mint oil distillation process. An unexpected result of this invention is improved yields and quality. Another unexpected result is that improved control over the hydrodistillation process is achieved with little or no equipment modification. This improved process comprises collecting the mint oil fractional components in predetermined time intervals based on processing time, temperature and component content.

Utilizing instrumentation to measure temperature and pressure at various points in the distillation system, it has been found that a significant portion of the distillation process involves heating the vat to operating temperature. Based on this observation, it was surmised that it would be possible to selectively collect enhanced quantities of oil at different time periods during the distillation process. Utilizing existing equipment, the inventor has experimented with time dependent collection of the mint oil, and has determined that during the early periods of hydrodistillation when the mint hay is much cooler, it is possible to collect enhanced quantities of mint oil containing the lighter ester fractions.

The problem of non-uniform sample analysis from barrel to barrel has long vexed mint distillers. It has been proposed that the phenomena relating to the heating of the mint tub was partially responsible for a significant portion of this variation. It was observed that as steam was initially introduced into the vat to thoroughly warm the mint hay, the mint oil collected during this early heating process was of different character than the mint oil collected during later stages of the hydrodistillation process. One theory is that the initial process of heating the mint hay allowed the lightest constituents to boil off early during the distillation process, while the heavier oils did not distill off until late in the distillation process when temperatures throughout the vat became more uniform and reached their peak.

Experimentation has confirmed that the lighter oils distill off earlier in the process in larger quantities while the heavier oils distill off later in the process. It appears that a significant portion of the variability in the quality of each barrel of oil is due to the mixing of oils from different times during the distillation process into one barrel. For example, one barrel might contain oil from the beginning portion of distillation of one batch, and the tail end of distillation of another batch, while perhaps another barrel contains all tail sections from multiple batches. By collecting distillates from similar portions of the distillation process, the method of this invention allows for an enriched and more uniform collection of mint oil and sample analysis to be achieved.

The process comprises collecting mint oil condensate for each tub of mint hay processed, at the same interval for each tub. For example, mint oil collected during the first 15 minutes of the distillation process is combined for each tub of mint hay processed. The mint oil collected during each following 15-minute time interval from each tub is also combined. In this manner mint oil enriched in the lighter esters can be collected during the early intervals, the mint oils are selectively collected in 15 pound mass intervals while mint oil enriched in the heavier esters can be collected late during the distillation process. An unexpected result of this improved process is the highest clarity mint oil is collected during the middle time intervals, between 30 minutes and 120 minutes time from the start of distillation.

Mint oil enriched with the lighter ester fractions, which has a higher economic value, is collected during earlier intervals. The light ester fraction oil is typically slightly discolored. Discoloring is less desirable than the oil of greater clarity for some uses, but the concentration of light esters is of high economic value. Another unexpected result of the process of this invention is that oil produced using this method yields more uniform composition analysis results. Because of the more uniform composition a grower can collect mint oil by this process that has improved economic value.

In operation, the mint oil distillation process deviates from the conventional process in the following manner. The mint oil condensate from the first 15-minute time interval is collected into a first separation tank. The condensate from the second 15-minute interval is collected into a second separation tank. The separation tanks are then substituted at 15-minute intervals, such that the condensate from each 15-minute interval for each batch of hay is collected and subsequently separated. This process can be accomplished by manually closing the valve at the outlet of the condensate tube and replacing the separation tank with a new separation tank. Alternatively, this may be accomplished by utilizing a 3-way valve which deposits the condensate into one tank, allowing a second tank to be changed while the first tank is processing. Yet another embodiment would allow for a series of valves, each dedicated to an individual separation tank. These valves would be opened and closed at the predetermined time intervals to allow the condensate to flow into each of the various separation tanks according to predefined time intervals. An unexpected result is that this process allows for mint oil enriched in lighter or heavier mint oil fractions to be collected during initial processing, with selection depending upon the application.

An advantage of this process is that it requires no additional equipment other than additional separation and storage tanks, but distinctly affects quality. This allows existing equipment to be utilized more efficiently and reduces the cost associated with producing mint oil by reducing the need for reprocessing.

Mint oil collected utilizing the process of this invention exhibits distinctly different characteristics than mint oil collected utilizing a bulk process. Test results indicate reduction of batch to batch variability. The mint oil collected during the first 15-minute intervals of this distillation process is enriched in the lighter esters and has been found to have a slightly green tinge. The lighter esters are of the highest economic value. It has been empirically determined that the oils collected during the middle processing intervals are much clearer than either the oils collected early or late in the mint oil distillation process. It has also been empirically determined that the mint oil collected late in the distillation process is enriched in the heaviest esters and also carries a green tinge. This oil is of the lowest economic value, however it may be reprocessed into useful oil depending upon the application.

The overall result of this new process is improved production and efficiency in the mint distillation industry.

BEST MODE FOR CARRYING OUT INVENTION

Figure 1:
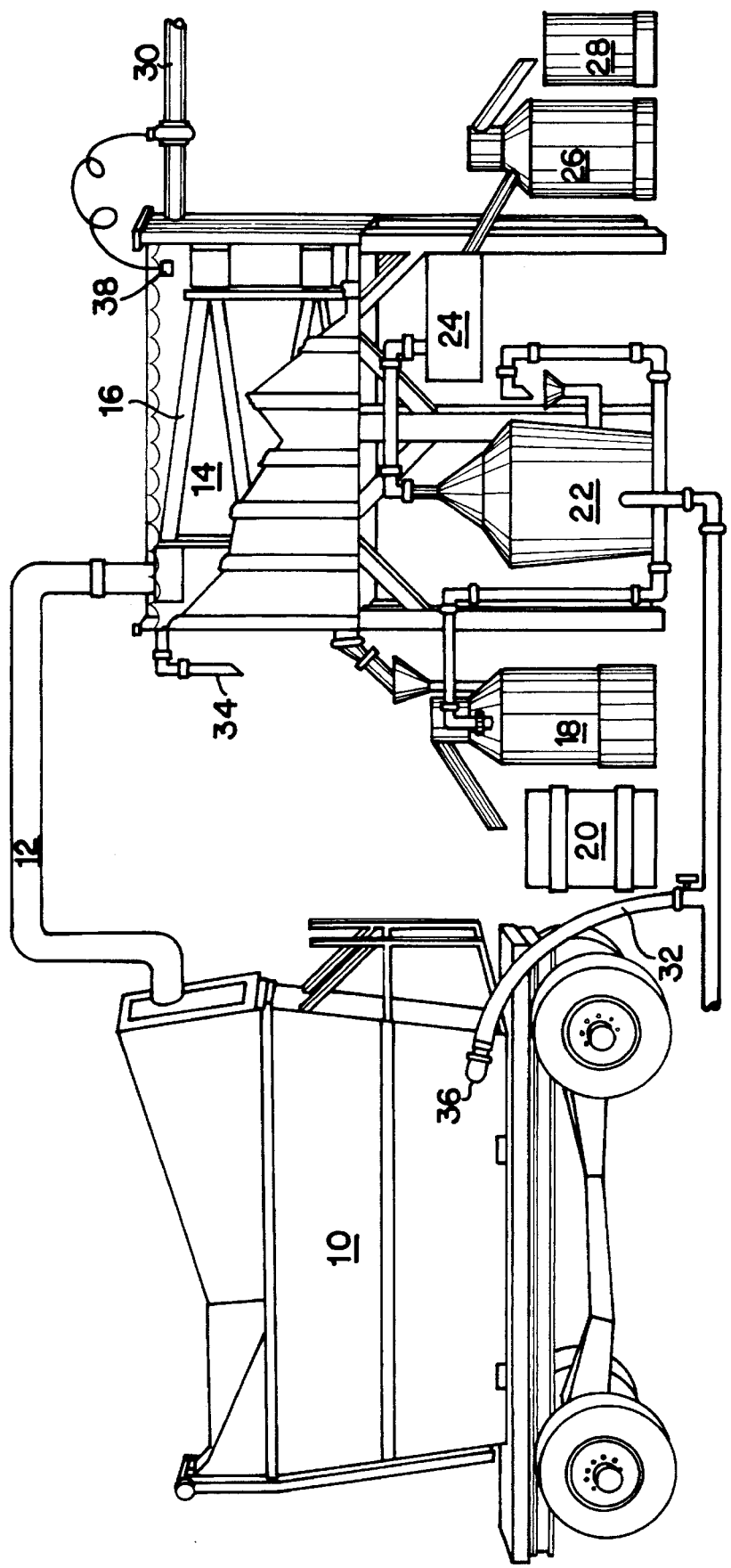
FIG. 1 is a representational diagram depicting a mint hay tub and distillation system.

Referring now to FIG. 1, mint hay is loaded into tub 10. At the distillation facility mint hay tub 10 is supplied with steam from steam supply 32 through connection 36. The steam passes upward through the mint hay, causing volatiles in the hay to evaporate. The steam and mint oil are passed through collector hose 12 to condensation coil 16 immersed in water tank 14. Water tank 14 is supplied with fresh water by water supply 30 which is discharged through water overflow 34. Temperature controller 38 maintains the desired coolant temperature. The steam and mint oil are condensed in condensation coil 16 and collected in separation tank 18. Within separation tank 18, the mixture of mint oil and water is separated by means of gravity. The mint oil floats to the surface and the water sinks to the bottom. The mint oil is skimmed from the top and collected in storage barrel 20.

Utilizing the current improved process the mint oil from the first 15-minute segment of hydrodistillation is collected in a first separation tank 18. The mint oil and condensate collected during the second 15-minute segment of distillation is collected in a second separation tank, and likewise for each successive 15-minute segment of collected mint oil. The separated mint oil from the first tank is collected in a first storage barrel. The mint oil collected in the second separation tank is collected in a second storage barrel and likewise for each separation tank of mint oil for the duration of the processing. Utilizing this process, ten separate mint oil segments will be collected during a typical 2½ hour processing. This results in the mint oil from each of the first 15-minute intervals being stored together. The mint oil from the second 15-minute interval is stored together, and likewise for each 15-minute interval and collection segment.

While there is shown and described the present preferred embodiment of the invention, it is to be distinctly understood that this invention is not limited thereto but may be variously embodied to practice within the scope of the following claims.

I claim:

1. A process for hydrodistillation of mint oils from unprocessed mint plants comprising:

passing pressurized steam through a quantity of chopped mint plant to vaporize essential mint oils contained in the chopped mint plant;

collecting the steam and essential mint oils;

condensing the mixture of steam and mint oils through a means for condensing vapors;

separating the condensed water and mint oils; and selectively collecting the mint oil condensates in fractions in approximately 15 minute time intervals, wherein the highest clarity mint oils are collected between 30 and 120 minutes from start of hydrodistillation.

2. The improved process of claim 1, wherein the fractions of mint oils are .further selectively collected in predetermined mass intervals.

3. The process of claim 2, wherein the fractions of mint oils are selectively collected in 15 pound mass intervals.

* * * * *

UNITED STATES PATENT AND TRADEMARK OFFICE
CERTIFICATE OF CORRECTION

PATENT NO : 5,582,694

DATED : December 10, 1996

INVENTOR(S) : George D. McClelland

It is certified that error appears in the above-identified patent and that said Letters Patent is hereby corrected as shown below:

At column 1, beginning at line 24, delete the word "mentholfuran".

At Column 1, beginning at line 30, in Table 1, column 1, change "Menthol Acetate" to read -- Menthyl Acetate --.

At Column 1, beginning at line 49, delete "is a known carcinogen" and insert -- has undesirable qualities. --

At Column 2, in line 59, delete the word "carcinogenic" and substitute the word -- undesirable -- .

Signed and Sealed this

Fifteenth Day of July, 1997

Attest:

*Attesting Officer*

BRUCE LEHMAN

*Commissioner of Patents and Trademarks*